(12) United States Patent
Rudaitis et al.

(10) Patent No.: US 11,874,641 B2
(45) Date of Patent: Jan. 16, 2024

(54) SYSTEM AND METHOD FOR CONTROLLING A VALVE MANIFOLD

(71) Applicant: Parker-Hannifin Corporation, Cleveland, OH (US)

(72) Inventors: Erick W. Rudaitis, Sterling Hts., MI (US); Timothy Faillo, Kalamazoo, MI (US); Serge Rondreux, Evreux (FR); Patrick Berdal, Fontaine la Guyon (FR)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/054,226

(22) Filed: Nov. 10, 2022

(65) Prior Publication Data
US 2023/0069780 A1 Mar. 2, 2023

Related U.S. Application Data

(62) Division of application No. 16/767,184, filed as application No. PCT/US2019/013424 on Jan. 14, 2019, now Pat. No. 11,531,314.

(Continued)

(51) Int. Cl.
G05B 19/042 (2006.01)
F15B 13/08 (2006.01)
F15B 20/00 (2006.01)

(52) U.S. Cl.
CPC ........ *G05B 19/0425* (2013.01); *F15B 13/085* (2013.01); *F15B 13/0853* (2013.01);
(Continued)

(58) Field of Classification Search
CPC ............ G05B 19/0425; G05B 19/0423; G05B 2219/21042; G05B 2219/25312;
(Continued)

(56) References Cited

U.S. PATENT DOCUMENTS 5,154,349 A 10/1992 Vaughn
5,277,622 A 1/1994 Liljenberg et al.
(Continued)

OTHER PUBLICATIONS

Festo: "CPX terminal", Jan. 1, 2010, XP055725434, Retrieved from the Internet: URL: https://www.festo.com/net/SupportPortal/Files/380596/CPX-FVDA-P_2010-11_570844g1.pdf [retrieved on Aug. 26, 2020].

(Continued)

*Primary Examiner* — Minh Q Le
(74) *Attorney, Agent, or Firm* — Renner, Otto, Boisselle & Sklar, LLP

(57) ABSTRACT

A valve driver system for driving a plurality of valves of a valve manifold. The system includes a plurality of valve drivers, wherein each valve driver is configured to drive a zone of one or more valves of the manifold; and, a power board that separately powers the respective valve drivers such that the valve drivers are powered separately with a separate power source that can individually power the valve driver. A multiple safety zone valve driver system for driving a plurality of valves of a valve manifold. The system includes a plurality of valve drivers; a first safe PM output; and a second safe PM output. The first and second safe PM outputs are configured such that in response to a first type of safety event the first PM output shuts off power to the first one or more valve drivers and the second PM output maintains power to the second one or more valve drivers. A zoning adapter for adapting logical addresses of valve drivers to physical addresses of valves of a valve manifold A conversion portion converts logical addresses to physical addresses of the valves in the different zones of the valve manifold with a spacing in one or more portions of the logical addresses.

7 Claims, 17 Drawing Sheets

Related U.S. Application Data

(60) Provisional application No. 62/624,156, filed on Jan. 31, 2018.

(52) U.S. Cl.
CPC .......... *F15B 13/0867* (2013.01); *F15B 20/00* (2013.01); *G05B 19/0423* (2013.01); *G05B 2219/21042* (2013.01); *G05B 2219/25312* (2013.01)

(58) Field of Classification Search
CPC  F15B 13/085; F15B 13/0853; F15B 13/0867; F15B 20/00
USPC ........................ 700/90, 19, 20, 22; 137/487.5
See application file for complete search history.

(56) References Cited

U.S. PATENT DOCUMENTS

| | | | |
|---|---|---|---|
| 5,495,871 A | 3/1996 | Meloche et al. | |
| 5,522,431 A | 6/1996 | Bonacorsi et al. | |
| 5,971,581 A * | 10/1999 | Gretta | G05B 19/0423 700/83 |
| 6,564,268 B1 | 5/2003 | Davis et al. | |
| 7,058,457 B2 * | 6/2006 | Kuwahara | G05B 15/02 700/20 |
| 7,907,388 B2 * | 3/2011 | DeBoer | H02J 13/00034 361/627 |
| 8,365,762 B1 * | 2/2013 | Trotter | B64D 1/18 91/363 R |
| 8,818,531 B2 * | 8/2014 | Kilibarda | G05B 19/41815 700/20 |
| 8,897,899 B2 * | 11/2014 | Marsters | A01G 25/16 700/19 |
| 9,014,825 B2 * | 4/2015 | Olson | G06F 1/24 700/22 |
| 2004/0153176 A1 | 8/2004 | Romagnoli et al. | |
| 2004/0179482 A1 | 9/2004 | Rusu | |
| 2006/0009863 A1 * | 1/2006 | Lingemann | G05B 15/02 700/20 |
| 2009/0228611 A1 | 9/2009 | Ferguson et al. | |
| 2010/0094471 A1 | 4/2010 | Lowery | |
| 2010/0251159 A1 | 9/2010 | De Carolis et al. | |
| 2014/0156063 A1 | 6/2014 | Neiser et al. | |
| 2014/0379098 A1 * | 12/2014 | Masten | G05B 19/0421 700/19 |
| 2015/0369380 A1 * | 12/2015 | De Carolis | F16K 31/0603 137/625 |
| 2016/0062323 A1 | 3/2016 | Strauser | |
| 2016/0092386 A1 | 3/2016 | Sakamoto | |
| 2017/0097102 A1 | 4/2017 | Atkin et al. | |
| 2017/0322888 A1 | 11/2017 | Booth et al. | |
| 2018/0023718 A1 | 1/2018 | De Carolis et al. | |
| 2018/0181522 A1 | 6/2018 | Leo et al. | |
| 2019/0116681 A1 | 4/2019 | De Carolis et al. | |
| 2020/0264593 A1 | 8/2020 | Rudaitis | |
| 2020/0364166 A1 * | 11/2020 | Rudaitis | G08B 5/36 |
| 2020/0393805 A1 * | 12/2020 | Rudaitas | G05B 19/0425 |
| 2021/0041035 A1 | 2/2021 | Sakamura et al. | |
| 2021/0096522 A1 | 4/2021 | Wrobel et al. | |

OTHER PUBLICATIONS

Festo: "CPX terminal/CPI system Electrical peripherals for perfect networking Excellent communicator", Feb. 1, 2012, XP055725435, Retrieved from the Internet: URL: https://www.wwdmag.com/sites/wwd/files/PSIplus_CPX_en.pdf [retrieved on Aug. 26, 2020].
Siemens: "Digital output module F-DQ 4x24 VDC/2A PM HF", Jul. 1, 2013, XP055725606 [retrieved on Aug. 27, 2020].
International Preliminary Report on Patentability (IPRP) corresponding application No. PCT/US2019/013424 dated Sep. 7, 2020.
Response to Second Written Opinion in International Application No. PCT/US2019/013424 filed on Aug. 11, 2020.
Second Written Opinion in International Application No. PCT/US2019/013424 dated May 12, 2020.
Response to Written Opinion filed in International Application No. PCT/US2019/013424 filed on Nov. 27, 2019.
International Search Report and Written Opinion issued by WIPO for corresponding patent application No. PCT/US2019/013424 dated Aug. 30, 2019.
European Search Report for corresponding European Patent No. 22173726.5 dated Aug. 16, 2022.

\* cited by examiner

| CONNECTOR | PIN # | SIGNAL | SPECIFICATIONS |
|---|---|---|---|
| | 1 | V LOGIC INPUT 2 | 100mA |
| | 2 | INPUT 1 OR OUTPUT N | INPUT: PNP OR OUTPUT (-Ve): 1A |
| | 3 | 0V LOGIC | RETURN |
| | 4 | INPUT 2 OR OUTPUT P | INPUT: PNP OR OUTPUT (+Ve): 1A |
| | 5 | V LOGIC INPUT 1 | 100mA |

FIG. 13

CONVERSATION BOARD (LOGIC TO PHYSICAL)

| | LOGICAL ADDRESS | OPTION 1 (322) | OPTION 2 (324) | OPTION 3 (326) | OPTION 4 (328) | OPTION 5 (330) | OPTION 6 (332) |
|---|---|---|---|---|---|---|---|
| DRIVER 20 | 0 | 0 | 0 | 0 | 0 | 0 | 0 |
| | 1 | 1 | 1 | 1 | 1 | 1 | 1 |
| | 2 | 2 | 2 | 2 | 2 | 2 | 2 |
| | 3 | 3 | 3 | 3 | 3 | 3 | 3 |
| | 4 | | 4 | 4 | 4 | 4 | 4 |
| | 5 | | 5 | 5 | 5 | 5 | 5 |
| | 6 | | 6 | 6 | 6 | 6 | 6 |
| | 7 | | 7 | 7 | 7 | 7 | 7 |
| DRIVER 22 | 8 | 4 | | 8 | 8 | 8 | 8 (X) |
| | 9 | 5 | | 9 | 9 | 9 | 9 (X) |
| | 10 | 6 | | 10 | 10 | 10 | |
| | 11 | 7 | | 11 | 11 | 11 | |
| | 12 | | | | | 12 | |
| | 13 | | | | | 13 | |
| | 14 | | | | | | |
| | 15 | | | | | | |
| DRIVER 24 | 16 | 8 | 8 | 12 | 12 | 14 | |
| | 17 | 9 | 9 | 13 | 13 | 15 | |
| | 18 | 10 | 10 | | 14 | | |
| | 19 | 11 | 11 | | 15 | | |
| | 20 | | 12 | | | | |
| | 21 | | 13 | | | | |
| | 22 | | 14 | | | | |
| | 23 | | 15 | | | | |
| DRIVER 26 | 24 | 12 | | 14 | | | |
| | 25 | 13 | | 15 | | | |
| | 26 | 14 | | | | | |
| | 27 | 15 | | | | | |
| | 28 | | | | | | |
| | 29 | | | | | | |
| | 30 | | | | | | |
| | 31 | | | | | | |

NO ZONING: 0 2 4 6 8 10 12 14 / 1 3 5 7 9 11 13 15

OPTION 1 — 4 ZONES (2 VALVES EACH)

OPTION 2 — 2 ZONES (2 VALVES EACH)

OPTION 3 — 4 ZONES (4-2-1-1)

OPTION 4 — 3 ZONES (4-2-2)

OPTION 5 — 3 ZONES (4-3-1)

OPTION 6 — 4 ZONES (5-1-1-1) (crossed out)

FIG. 18

SYSTEM AND METHOD FOR CONTROLLING A VALVE MANIFOLD

This application is a divisional of U.S. application Ser. No. 16/767,184 filed on May 27, 2020, which is a national phase of International Application No. PCT/US2019/013424 filed Jan. 14, 2019 and published in the English language, which claims benefit of U.S. Provisional Application No. 62/624,156, filed on Jan. 31, 2018, all of which applications are incorporated by reference.

FIELD OF INVENTION

This application relates generally to systems and methods for controlling valve manifolds, and more particularly to systems and methods for separately powering drivers of a valve manifold and for providing more flexibility in addressing multiple zones of valves of a valve manifold.

BACKGROUND

Factory and process automation systems that are used in, for example, automobile manufacturing and assembly plants, may employ fieldbus controllers to control valve manifolds having a plurality of zones of pneumatic or hydraulic valves. For some fieldbus controllers, there remain various shortcomings, drawbacks, and disadvantages relative to certain applications.

For example, some controllers and manifolds have limited means for powering or addressing valves, making it difficult, for example, to change which driver controls which valve or zone of valves. Further, the drivers rely on a single power input and can only use certain predesignated addresses. This makes spreading more drivers among fewer valves either cost prohibitive or technically impractical. Numerous systems are available for addressing new valves in a manifold, but none are for splitting addresses up among the valve drivers. Typically the main concern with addressing is to create a clear address format rather than making the addresses more adaptable.

Some valve modules integrate safety modules that can cut power to individual valves, for example, by using zoned safety capabilities that add safety groups of valves. In a single safety zone system, when a safety event is triggered, for example when a light curtain is interrupted, the controller shuts off the entire valve manifold. This can create backups and become a substantial problem for the user. In an effort to solve this problem, some systems add safety zones covering small groups of valves directly on the manifold, so the user can be more precise when there is a need for a shut down. Such systems, however, fail to separately power or control the drivers and thus act merely as an emergency stop for the manifold.

Accordingly, there remains a need for further contributions in this area of technology.

SUMMARY OF INVENTION

The application relates to providing more control over valves of a valve manifold, including providing separate power to separate valve drivers of valves, providing multiple safety zones that enable power to be shut off to one zone of valve drivers while maintaining power to another zone of valve drivers, and providing a zoning adapter that adapts logical addresses of valve drivers to physical addresses of valves of a valve manifold.

According to one aspect of the invention, a valve driver system for driving a plurality of valves of a valve manifold, includes a plurality of valve drivers, wherein each valve driver is configured to drive a zone of one or more valves of the manifold; and, a power board that separately powers the respective valve drivers such that the valve drivers are powered separately with a separate power source that can individually power the valve driver.

Embodiments of the invention may include one or more of the following additional features separately or in combination.

The valve driver system may include a power connector connected to the power board that includes separate V+ (pluses) pins for the respective valve drivers and a common V− (minus) ground pin.

The valve driver system may include a switch selectively to turn power off to one valve driver and respective zone of one or more valves and maintain power to another valve driver and respective zone of one of more valves.

According to another aspect of the invention, a method of driving a plurality of valves of a valve manifold, includes providing a plurality of valve drivers, wherein each valve driver is configured to drive a zone of one or more valves of the manifold; and, separately powering the respective valve drivers such that the valve drivers are powered separately with a separate power source that can individually power the valve driver.

Embodiments of the invention may include one or more of the following additional features separately or in combination.

The method may include turning power off to one valve driver and respective zone of one or more valves and maintaining power to another valve driver and respective zone of one of more valves.

According to another aspect of the invention, a multiple safety zone valve driver system for driving a plurality of valves of a valve manifold, includes a plurality of valve drivers, wherein each valve driver is configured to drive one or more valves of the manifold; a first safe PM output that is operative to provide and shut off power to a first one or more of the valve drivers; and a second safe PM output that is operative to provide and shut off power to a second one or more of the valve drivers separately from the first PM output providing and shutting off power to the first one or more of the valve drivers. The first and second safe PM outputs are configured such that in response to a first type of safety event the first PM output shuts off power to the first one or more valve drivers and the second PM output maintains power to the second one or more valve drivers.

Embodiments of the invention may include one or more of the following additional features separately or in combination.

The first and second safe PM outputs may be configured such that in response to a second type of safety event the first safe PM output maintains power to the first one or more valve drivers and the second safe PM output shuts off power to the second one or more valve drivers.

The multiple safety zone valve driver system may include a power and ground to the first one or more valve drivers and separate power and ground to the second one or more valve drivers.

The multiple safety zone valve driver system may be further configured to obtain power from an AUX V+ and an AUX V−.

According to another aspect of the invention, a method of driving a plurality of valves of a valve manifold, includes providing a plurality of valve drivers, wherein each valve driver is configured to drive one or more valves of the manifold; providing power to a first one or more of the valve drivers; providing power to a second one or more of the valve drivers separately from providing power to the first one or more of the valve drivers; in response to a first type of safety event, shutting off power to the first one or more valve drivers and maintaining power to the second one or more valve drivers.

The method may include, in response to a second type of safety event, maintaining power to the first one or more valve drivers and shutting off power to the second one or more valve drivers.

The providing power to the first one or more of the valve drivers may include connecting a power and ground to the first one or more valve drivers, and the shutting off power to the first one or more of the valve drivers includes disconnecting the power and ground to the first one or more valve drivers.

According to another aspect of the invention, a zoning adapter for adapting logical addresses of valve drivers to physical addresses of valves of a valve manifold, includes a first end configured to receive logical addresses of a plurality of valve drivers; a second end for connection to physical addresses of valves in different zones of the valve manifold, wherein the number of physical addresses is less than the number of logical addresses; and a conversion portion that converts the logical addresses to the physical addresses of the valves in the different zones of the valve manifold with a spacing in one or more portions of the logical addresses.

Embodiments of the invention may include one or more of the following additional features separately or in combination.

The valve drivers may be separately powered.

The zoning adapter may include a cable that ports traces from the valve drivers to traces of an interconnection board for the valves of the valve manifold.

The conversion portion may convert 32 logical addresses (0, 1, 2, . . . 31) to 16 physical addresses of eight (8) valves.

The 32 logical addresses may be the logical addresses of four (4) different valve drivers each having eight (8) logical addresses.

The eight (8) valves may be in four (4) different zones of the valve manifold, and the conversion portion may convert the 32 logical addresses with a spacing in four (4) portions (4, 5, 6, 7; 12, 13, 14, 15; 20, 21, 22, 23; 28, 29, 30, 31) of the logical addresses (0, 1, 2, . . . 31).

According to another aspect of the invention, a method of adapting logical addresses of valve drivers to physical addresses of valves of a valve manifold, includes receiving logical addresses of a plurality of valve drivers; arranging physical addresses of valves in different zones of the valve manifold, wherein the number of physical addresses is less than the number of logical addresses; and converting the logical addresses to the physical addresses of the valves in the different zones of the valve manifold with a spacing in one or more portions of the logical addresses.

Embodiments of the invention may include one or more of the following additional features separately or in combination.

The converting may include converting 32 logical addresses (0, 1, 2, . . . 31) to 16 physical addresses of eight (8) valves.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 13 is a table of a configurable safe input or safe PM output pin configuration.

FIG. 18 is schematic diagram of a four zone controlled eight-valve valve manifold.

DETAILED DESCRIPTION

Figure 1:
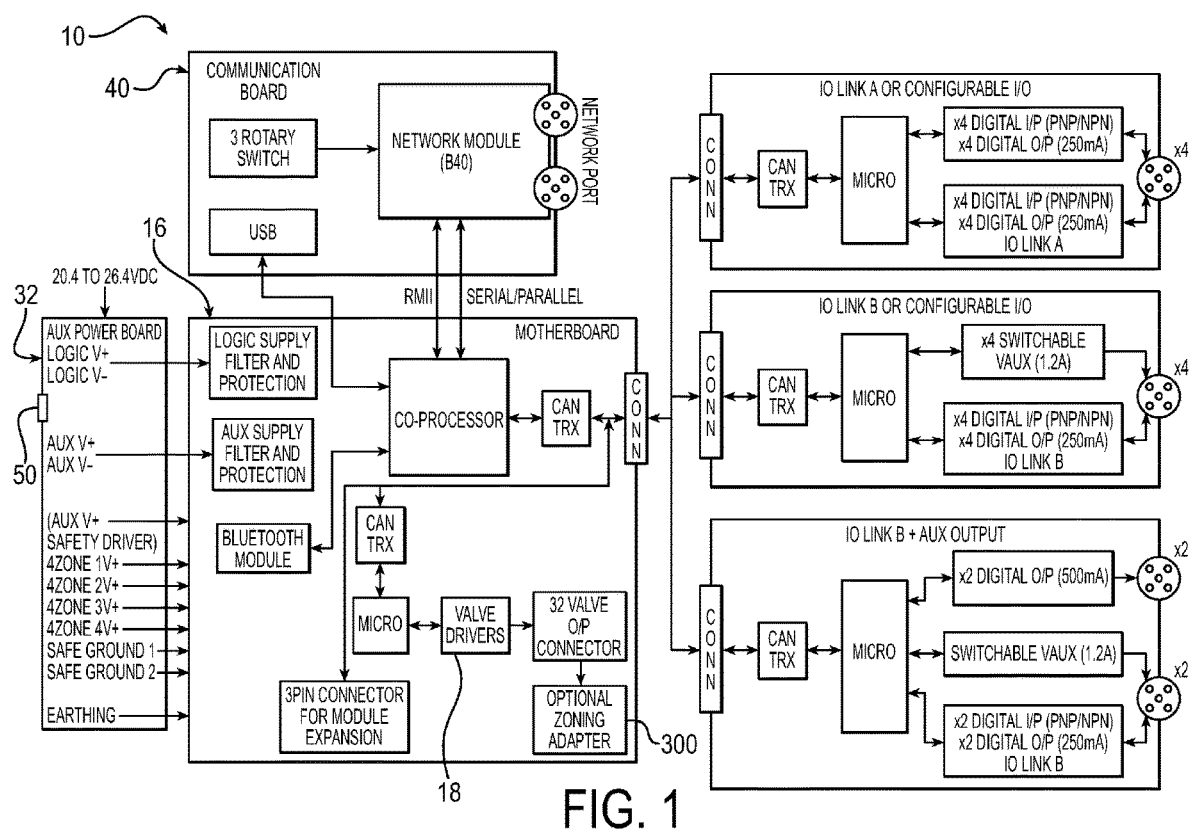
FIG. 1 is an electrical architecture block diagram of a valve driver system in accordance with an embodiment of the invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 2:
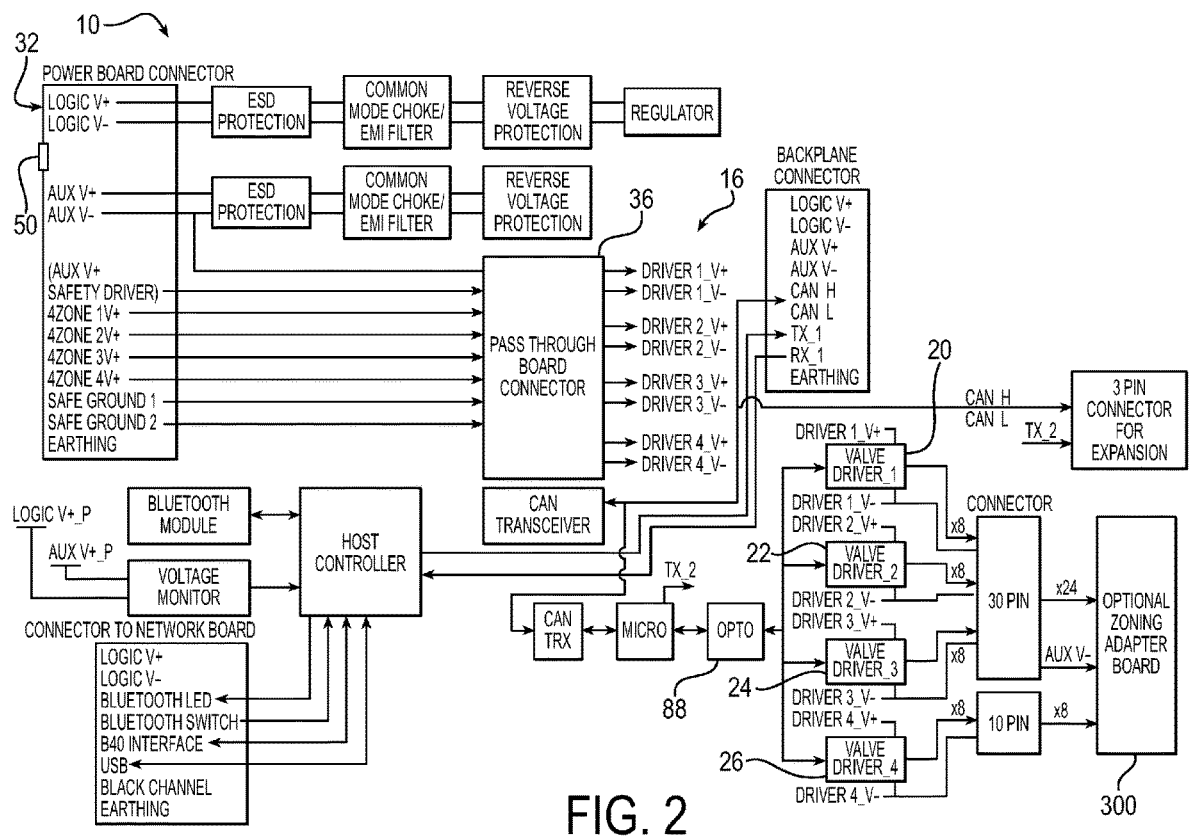
FIG. 2 is an electrical architecture schematic diagram of a motherboard of the valve driver system of FIG. 1.
Figure 3:
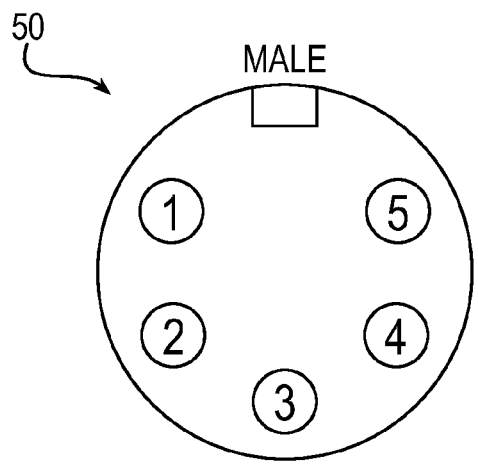
FIGS. 3 and 4 are schematic diagrams of power connectors of the valve driver system of FIG. 1.
Figure 4:
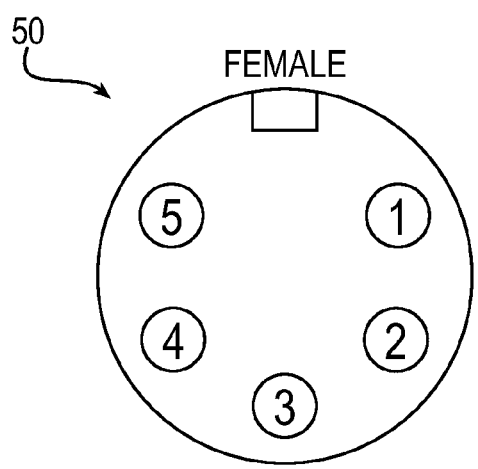
Figure 5:
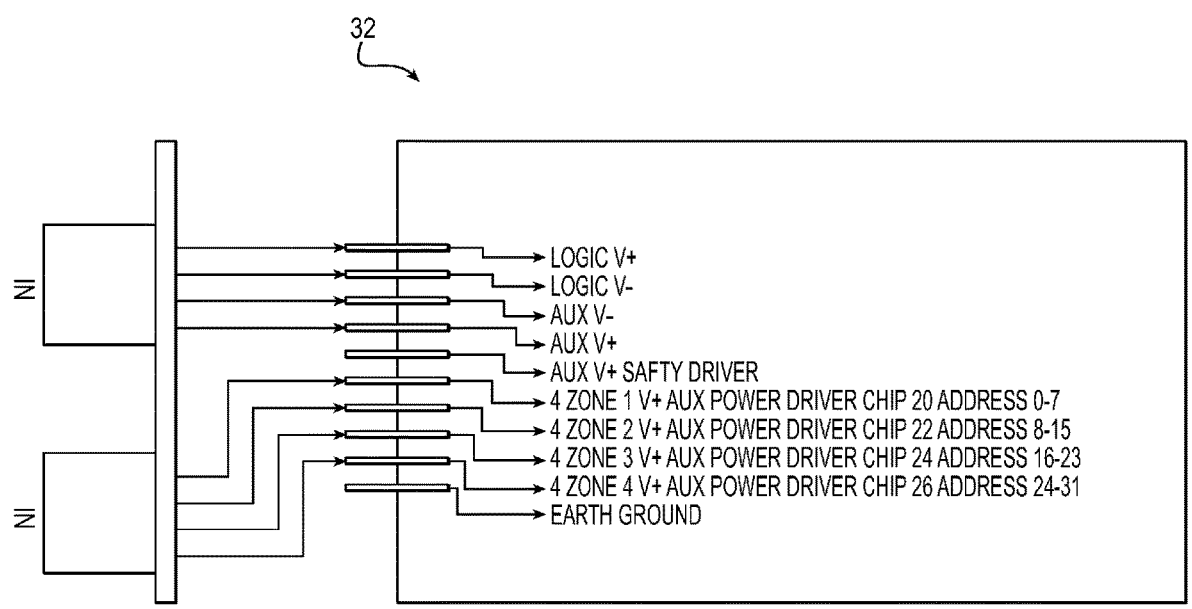
FIG. 5 is a schematic diagram of an auxiliary power board configuration E & F of the valve driver system of FIG. 1.

FIGS. 1-7 show a valve driver system 10 in accordance with an embodiment of the invention. The valve driver system 10 forms part of a fieldbus controller 12 shown in FIG. 21, that drives a plurality of valves of a valve manifold 14. As shown schematically in FIGS. 1 and 2, the valve driver system 10 includes a motherboard 16 having thereon a plurality 18 of valve drivers, four valve drivers 20, 22, 24, 26 in the illustrative embodiment, a power board 32 that provides power to the valve drivers 20, 22, 24, 26 and other components of the motherboard 16 via a pass through board connector 36, and a communication board 40 that links the motherboard 16 to an industrial network of, for example, an automobile manufacturing or assembly plant. A five pin AUX power connector 50 is connected to the power board 32 and in turn to the motherboard 16, as shown at the left side of FIGS. 1 and 2. As shown in FIGS. 3 and 4, the power connector 50 includes four separate power pins for the respective four valve drivers 20, 22, 24, 26, and a common ground. The four separate power pins enable the power connector 50 to separately power each of the four valve drivers 20, 22, 24, 26. The power board 32, also referred to herein as an AUX power board 32, may have a configuration as shown in FIG. 5. As the power connector 50 allows for four separate power inputs, each valve driver 20, 22, 24, 26 receives its own power, thereby enabling the valve drivers 20, 22, 24, 26 to be powered individually.

Figure 6:
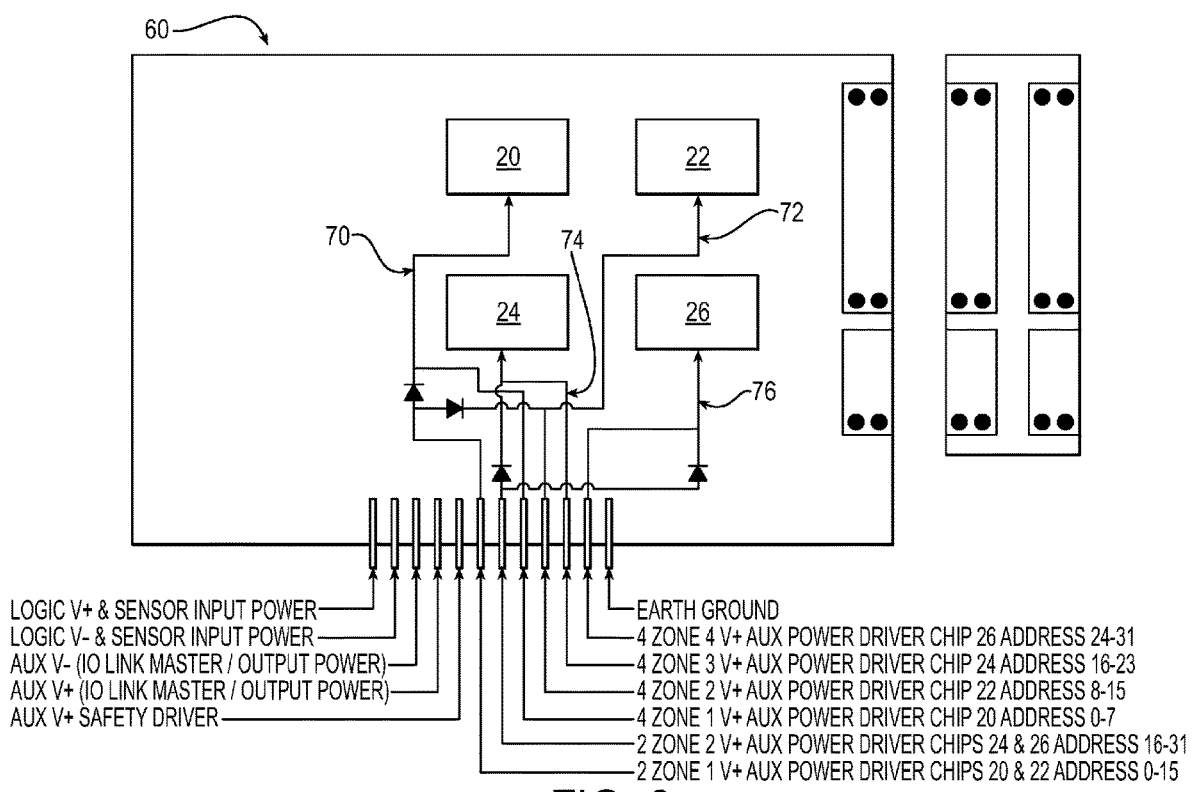
FIG. 6 is a schematic diagram showing four valve drivers, each with a separate power input, and an address converter board of the valve driver system of FIG. 1.
Figure 7:
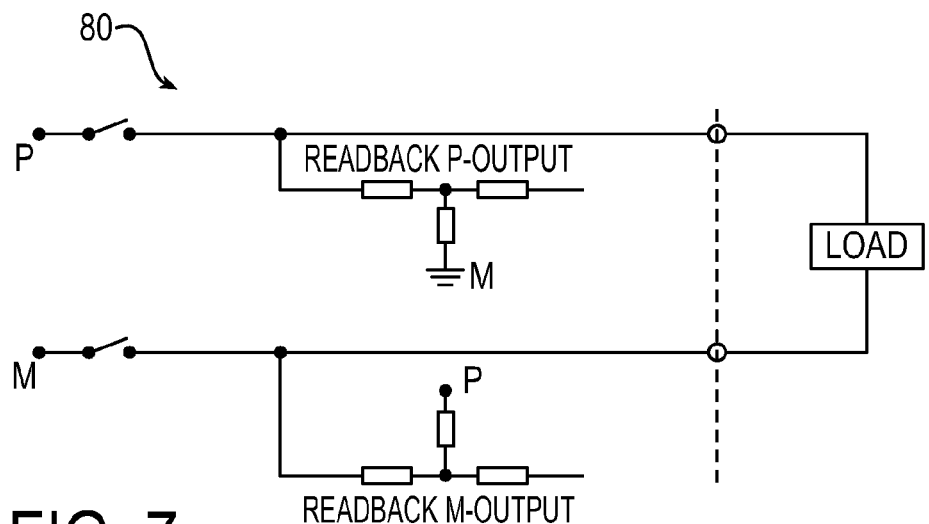
FIG. 7 is a schematic diagram of a safe PM channel output used in association with the valve drivers of FIG. 6.

FIG. 6 shows a valve manifold controller 60 including four separately powered valve driver chips or cards 20, 22, 24, 26, each with a separate power input, where the power going to a valve driver 20, 22, 24, 26 is identified respectively by reference numerals 70, 72, 74, 76. Four power zones, Zone 1, Zone 2, Zone 3, Zone 4, are provided by using a safe PM channel output 80 as shown in FIG. 7, and the AUX power board 32 configured as shown in FIG. 5. In an embodiment, Zone 1 may be associated with valve driver 20 and have eight associated addresses 0-7; Zone 2 may be associated with valve driver 22 and have eight associated addresses 8-15; Zone 3 may be associated with valve driver 24 and have eight associated addresses 16-23; and Zone 4 may be associated with valve driver 26 and have eight associated addresses 24-31. The controller 60 may be a single address controller for addressing four (4) different zones of eight (8) single solenoid valves each, or a double address controller for addressing four (4) different zones of four (4) double solenoid valves each. In another embodiment, which is shown in FIG. 6, two power zones, Zone 1 and Zone 2, are provided, where Zone 1 may be associated with valve drivers 20, 22 and have 16 associated addresses 0-15, and Zone 2 may be associated with valve drivers 24, 26 and have 16 associated addresses 16-31. The controller 60 may be a single address controller for addressing four (4) different zones of eight (8) single solenoid valves each, or a double address controller for addressing four (4) different zones of four (4) double solenoid valves each. The controller 60 may be a single address controller for addressing two (2) different zones of eight (8) single solenoid valves each, or a double address controller for addressing two (2) different zones of eight (8) double solenoid valves each. As will be appreciated, because the valve drivers 20, 22, 24, 26 are separately powered, the valve drivers 20, 22, 24, 26 are less connected to one another, and thus are less likely to be affected by one another. The pass through board connector 36 ensures that the power going to the valve driver 20, 22, 24, 26 is separated. Since the V+ and V− are separate to each valve driver 20, 22, 24, 26 and the communication is opto isolated (see reference numeral 88 in FIG. 2, to the left of valve driver 22) the crosstalk between the valve drivers 20, 22, 24, 26 is prevented. Board layout may also be taken into consideration to prevent cross talk from traces being close together and less likely to affect another valve driver. As will be described in greater detail below, the separation of the valve drivers 20, 22, 24, 26 allows for the emphasis of dividing valves among the different valve drivers 20, 22, 24, 26.

Figure 8:
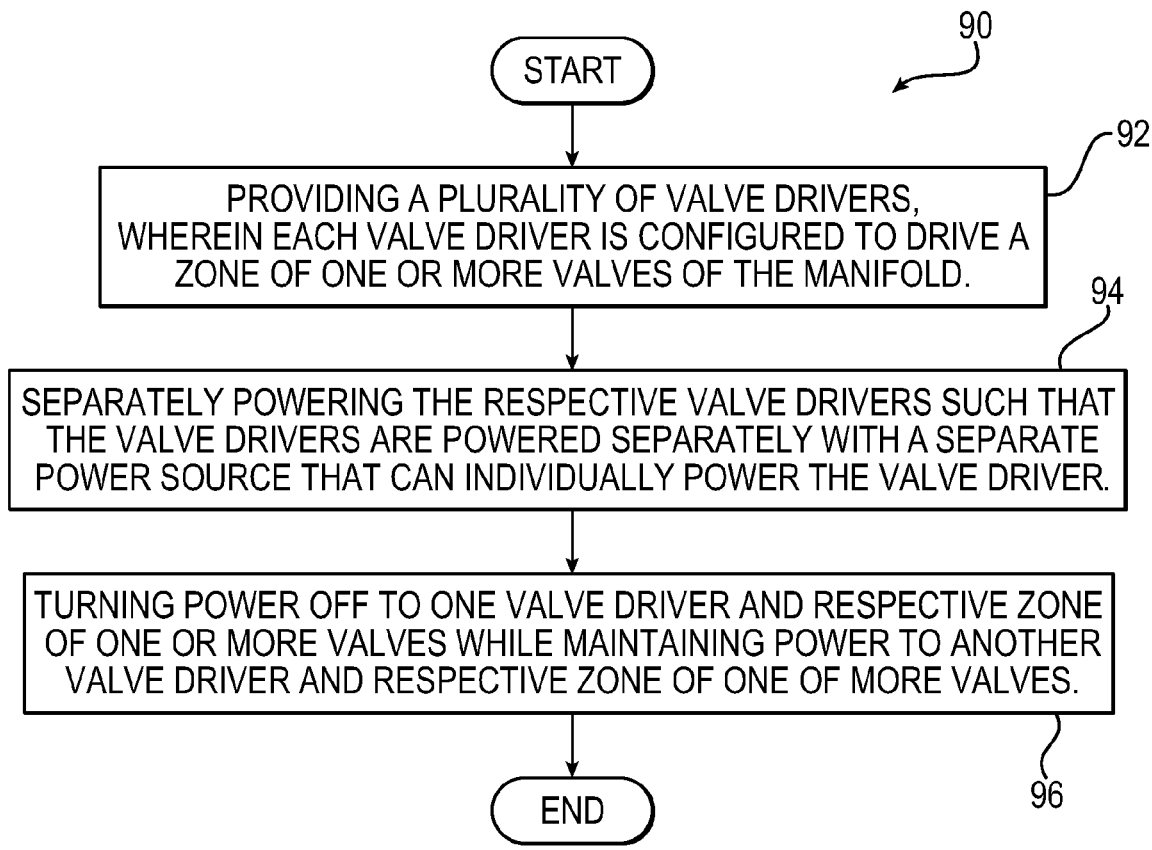
FIG. 8 is a flowchart showing a method of driving a plurality of valves of a valve manifold in accordance with an embodiment of the invention.

FIG. 8 shows a flowchart 90 of a method of driving a plurality of valves of a valve manifold. The method includes a step 92 of providing a plurality of valve drivers, wherein each valve driver is configured to drive a zone of one or more valves of the manifold. In step 94, power is provided separately to the respective valve drivers such that the valve drivers are powered separately with a separate power source that can individually power the valve driver. In step 96, power is turned off to one valve driver and respective zone of one or more valves and power is maintained to another valve driver and respective zone of one of more valves.

Figure 9:
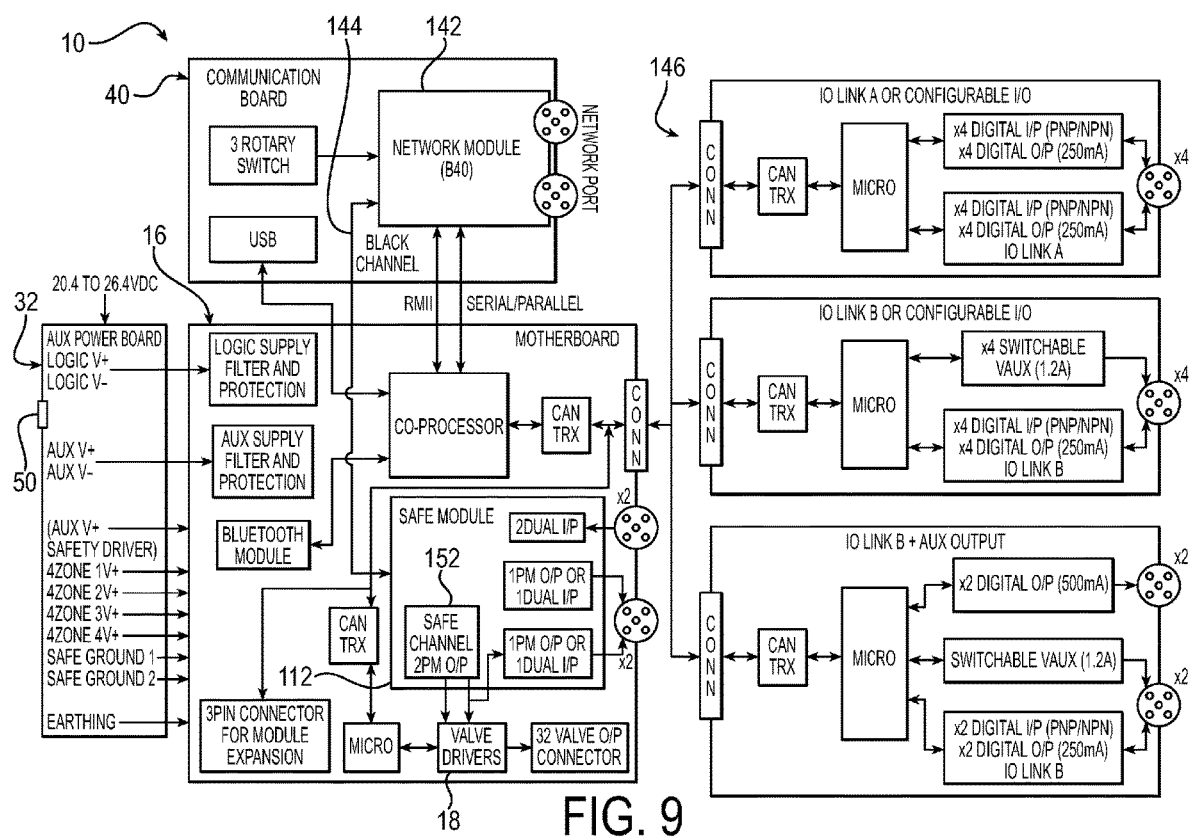
FIG. 9 is an electrical architecture block diagram of a valve driver system in accordance with another embodiment of the invention.
Figure 10:
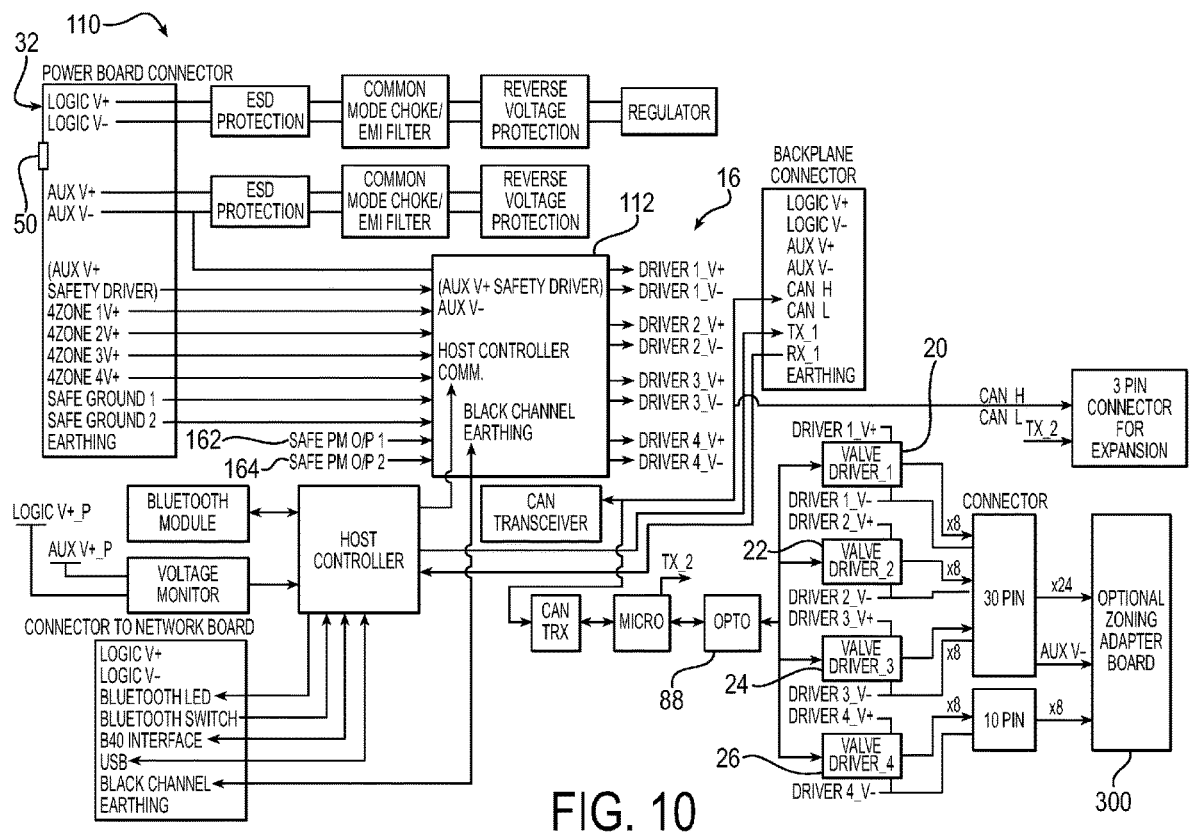
FIG. 10 is an electrical architecture schematic diagram of a motherboard of the valve driver system.
Figure 11:
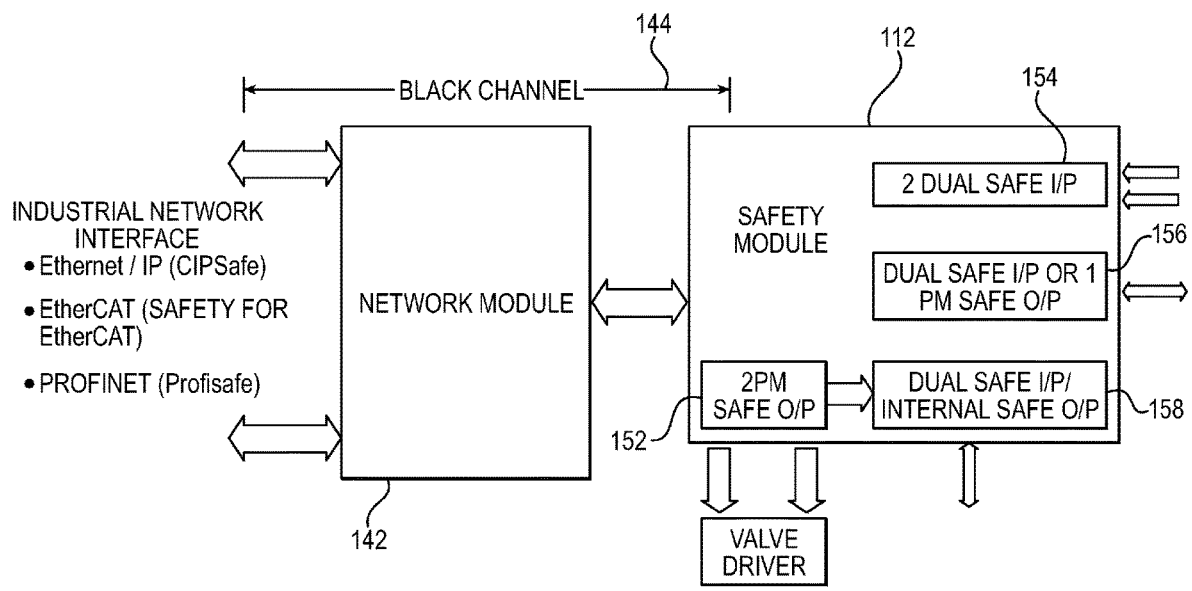
FIG. 11 is schematic diagram of a two zone pass through board of the valve driver system.

Turning now to FIGS. 9-15, there is shown a valve driver system 110 having a safety module 112 in accordance with another embodiment of the invention. The valve driver system 110 in FIGS. 9 and 10 is in many respects similar as the above-referenced valve driver system 10 of FIGS. 1 and 2, and consequently the same reference numerals are used to denote structures corresponding to similar structures in the FIGS. 1 and 2 valve driver system 10. In addition, the foregoing description of the FIGS. 1 and 2 valve driver system 10 is equally applicable to the valve driver system 110 of FIGS. 9 and 10, except as noted below. Moreover, it will be appreciated upon reading and understanding the specification that aspects of the valve drive systems 10, 110 may be substituted for one another or used in conjunction with one another where applicable.

As shown in FIGS. 9 and 10, the safety module 112 of the valve driver system 110 may be located on the motherboard 16 and connected to a network module 142 on the communication board 40 via a black channel 144. The safety module 112 is also connected to the plurality 18 of valve drivers, four valve drivers 20, 22, 24, 26 in the illustrative embodiment, and four connectors 146. The safe IO can be SIL3 compliant as per IEC 61508 and performance level (CAT3 PLe) in accordance with EN ISO 13849. As shown in FIG. 9 and in greater detail in FIG. 11, the safety module 112 may include a safe channel with two PM outputs 152, two safe inputs 154, either a PM safe output or two safe inputs 156, and either an internal safe output or two safe inputs 158.

Figure 12:
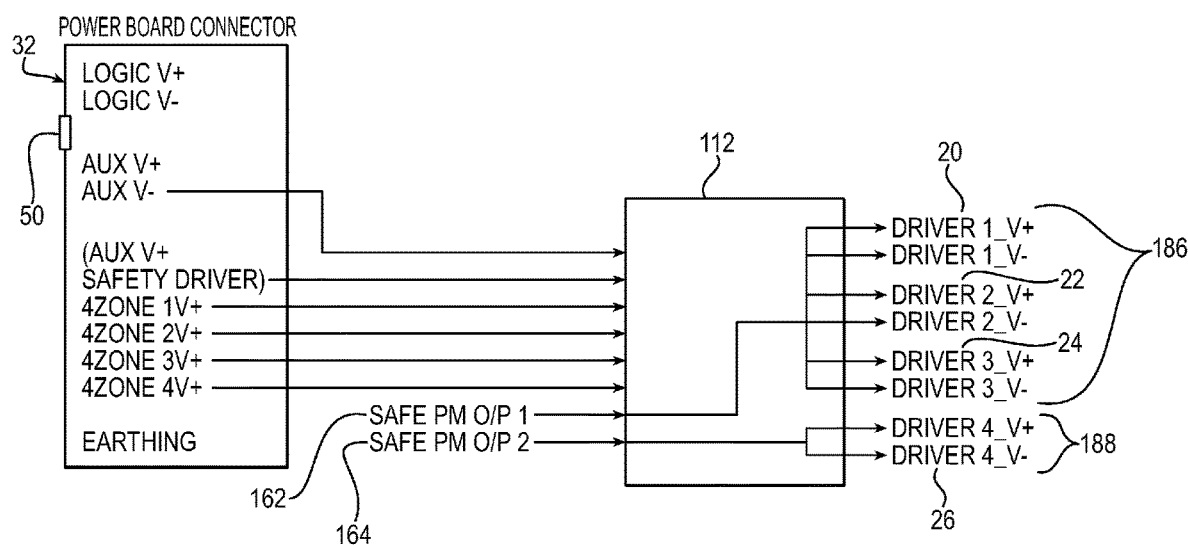
FIG. 12 is a block diagram of a safety block of the valve driver system.

An example route of the driver power of the safe channel with two PM outputs 152 is shown in FIG. 12, that is "two safe zones" in the valve manifold in which the V+ and V− can be disconnected from the valve drivers. In FIG. 12, one safety output Safe PM O/P 1 at reference number 162 is operative to turn off power to the first three (3) drivers 20, 22, 24 (for example, the first 24 valves of a 32 valve manifold), and the other separate safety output Safe PM O/P 2 at reference number 164 is operative to turn off power to the fourth driver 26 (for example, the last 8 valves of a 32 valve manifold). Thus, the safe PM output 162 powers/controls the first three valve drivers 20, 22 and 24, and the safe PM output 164 powers/controls the fourth valve driver 26. In this sense, the safety module 112 has two safety outputs, one that turns off power to the first three valve drivers 20, 22, 24 (the first 24 valves), and the other separate safe PM output that turns off power to the fourth driver 26 (the last 8 valves).

Figure 14:
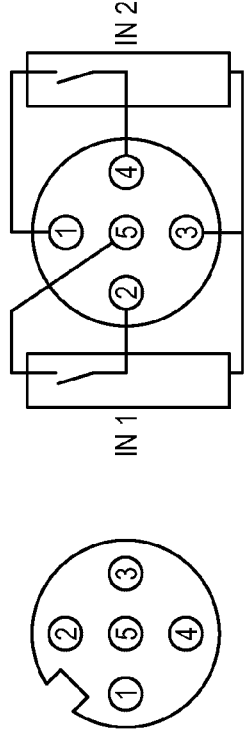
FIG. 14 is a table of a safe input connector pin configuration.

The safety module 112 may monitor safety messages received over the black channel 144 and the safety inputs. The safety module 112 may turn off the valve driver power (safe state) in case any safety event gets triggered. The inputs and outputs may take on any suitable configuration. The safety module 112 may have two safety PM outputs. There may be two user configurable dual safe input or PM output (for example, 2×M12, A-coded connectors) as per a pin configuration 176 such as shown in FIG. 13. Out of two safe PM outputs, one safe PM output may be the same as the internal second PM output which may be for the 8 valve drive, for example. The other PM output may be on the logic power. The two (2) safe PM outputs may be for the valve driver power. One safe PM output may be for 24 valves 186 and the other safe output may be for eight (8) valves 188 with a connector pin configuration 178 such as shown in FIG. 14.

Figure 15:
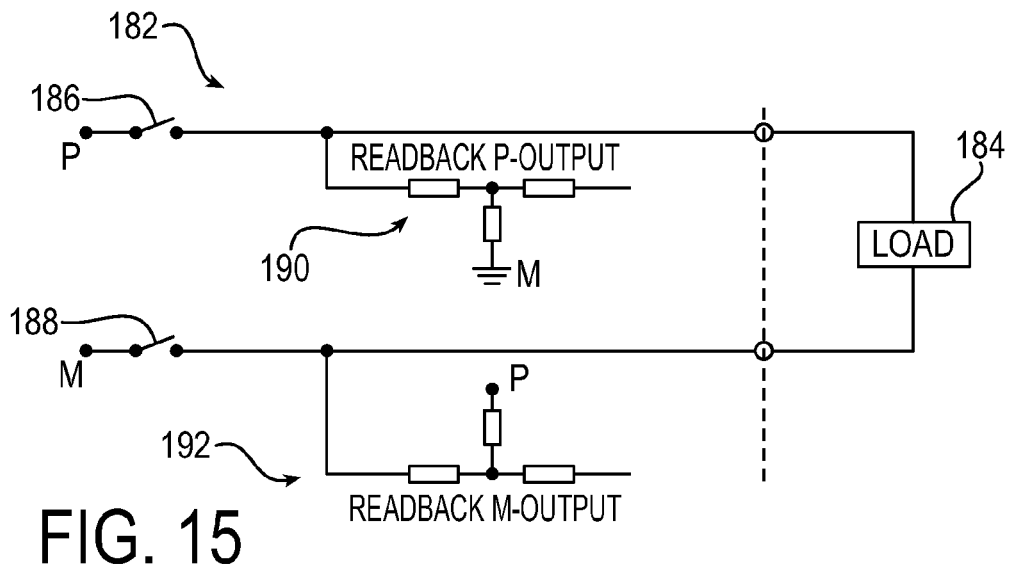
FIG. 15 is a schematic diagram of a wire diagram of a PM channel output used in association with the valve drivers.

FIG. 15 shows an example of a wire diagram 182 for a safe PM output. For a PM output, the load 184, that is valve driver power, may be connected across the P-switch 186 and the M-switch 188. The PM output may have a P-output read back 190 and an M-output read back 192 to perform tests such as dark, light and switch-ON tests. FIG. 12 shows the power coming through the power board 32, through one Safe PM O/P 1 162 powering the first three drivers 20, 22, 24, and through a second Safe PM O/P 2 164 powering the fourth driver 26. As will be appreciated, Safe PM O/P 1 162 and Safe PM O/P 2 164 of the safety module 112 separate the ground and power to the valve drivers; as such, there is no common ground. With a separate ground nothing gets back fed and inadvertently turned on.

The safety module 112 may be an optional built in module, that may interface to the network module 142 over a serial UART (universal asynchronous receiver/transmitter) interface. In operation, the network module 142 extracts a safety telegram over the configured network protocol. The safety telegram may be sent to the safety module 112 for example by the network module 142 in FIGS. 9 and 11. The safety module 112 may interpret the safety telegram. In case a safety event is triggered, the safety module 112 goes into a safe state. In the safe state, the safety module 112 switches OFF the valve driver power.

As will be appreciated, using the PM outputs for the safety zones is beneficial because they disconnect the load 184 from both the power and the ground, preventing the possibility of both high side and low side shorts. Using multiple safety zones and separately powering drivers in each zone, a user can configure certain valves to shut off for specific safety events, while not risking the power supply to the remaining valves. This is beneficial because the occurrence of a safety event would not have to stop an entire machine, but could allow other sections of the machine to keep operating.

Figure 21:
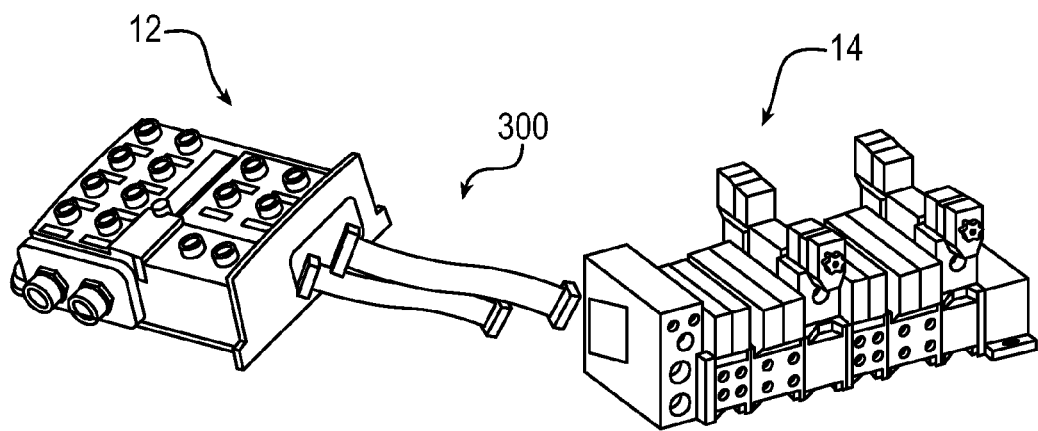
FIG. 21 shows a fieldbus controller incorporating a valve driver system and connected to a valve manifold via a zoning adapter.

In an embodiment, the fieldbus controller 12 shown in FIG. 21 has a modular capability, whereby the controller 12 can be used in a non-safe variant in which the controller 12 includes the pass through board connector 36 (FIG. 2) or a safe variant in which the controller 12 includes the safety module 112 (FIG. 10). In this regard, the pass through board connector 36 can be removed and the safety module 112 can be inserted in its place, or vice versa. With the safety module 112 in place of the pass through board connector 36, the safety module 112 controls the power going to the valve drivers 20, 22, 24, 26 over a safe network, basically functioning as a safety switch to power the valve drivers 20, 22, 24, 26. As an example, in the non-safe variant, or non-safe mode, there may be four zones 1 V+, 2 V+, 3 V+ and 4 V+, going through the pass through board connector 36 that individually provide power to the respective valve drivers 20, 22, 24, 26, as shown for example in FIG. 6. If a user desires to use the safe variant, or safe mode, the user can insert the safety module 112 in place of the pass through board connector 36, in which case the safety module 112 obtains its power from the AUX V+ and AUX V−, and the Safe PM O/P 1 provides power to the valve drivers 20, 22 and 24, and the Safe PM O/P 2 provides power to the valve driver 26, as shown for example in FIG. 12.

Figure 16:
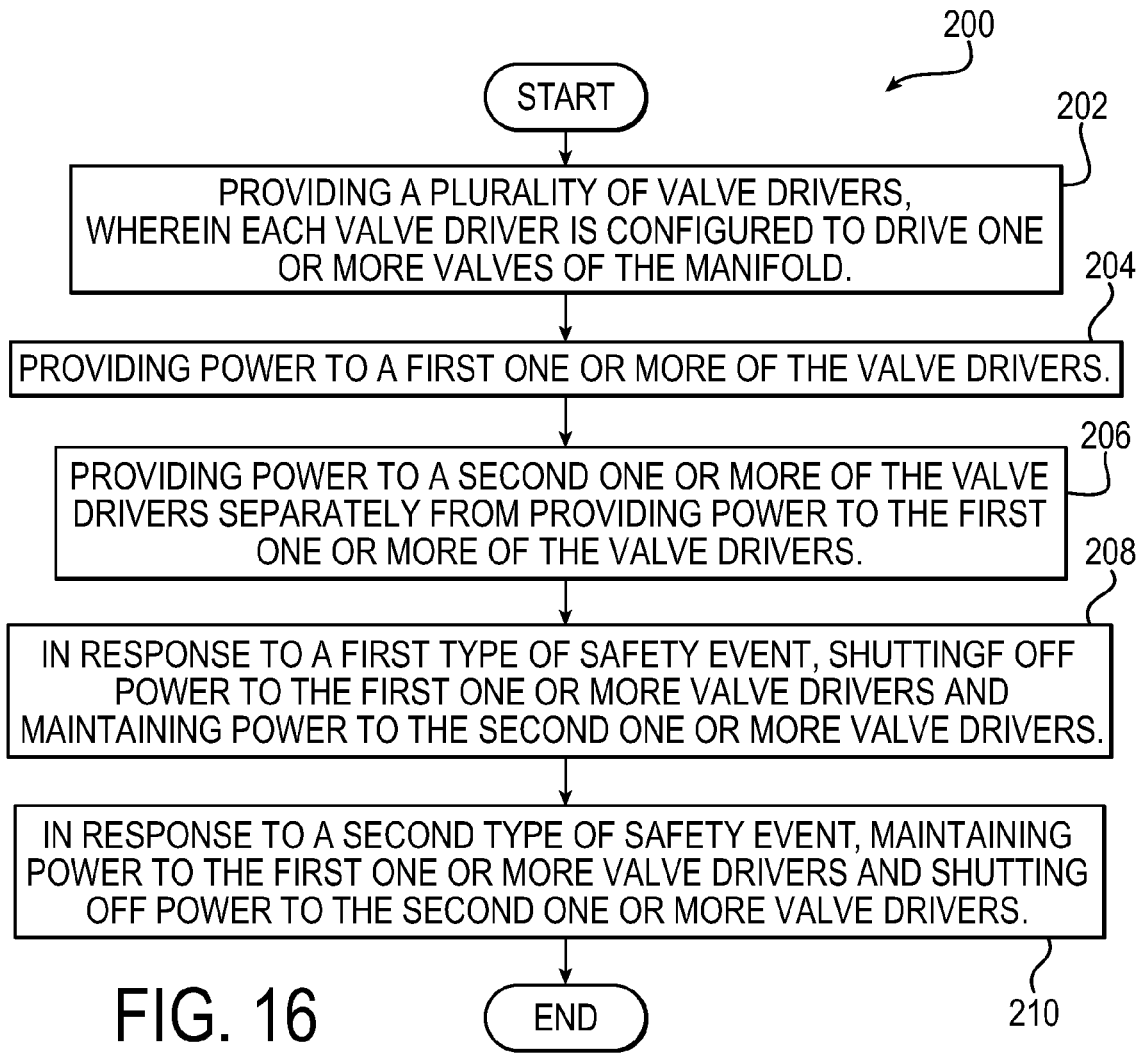
FIG. 16 is a flowchart showing a method of driving a plurality of valves of a valve manifold in accordance with an embodiment of the invention.

FIG. 16 shows a flowchart 200 of a method of driving a plurality of valves of a valve manifold. The method includes a step 202 of providing a plurality of valve drivers, wherein each valve driver is configured to drive one or more valves of the manifold. In step 204, power is provided to a first one or more of the valve drivers. In step 206, power is provided to a second one or more of the valve drivers separately from providing power to the first one or more of the valve drivers. In step 208, in response to a first type of safety event, power is shut off to the first one or more valve drivers and power is maintained to the second one or more valve drivers. In step 210, in response to a second type of safety event, power is maintained to the first one or more valve drivers and power is shut off to the second one or more valve drivers. The providing power to the first one or more of the valve drivers may include connecting a power and ground to the first one or more valve drivers. The shutting off power to the first one or more of the valve drivers can include disconnecting the power and ground to the first one or more valve drivers.

Figure 17:
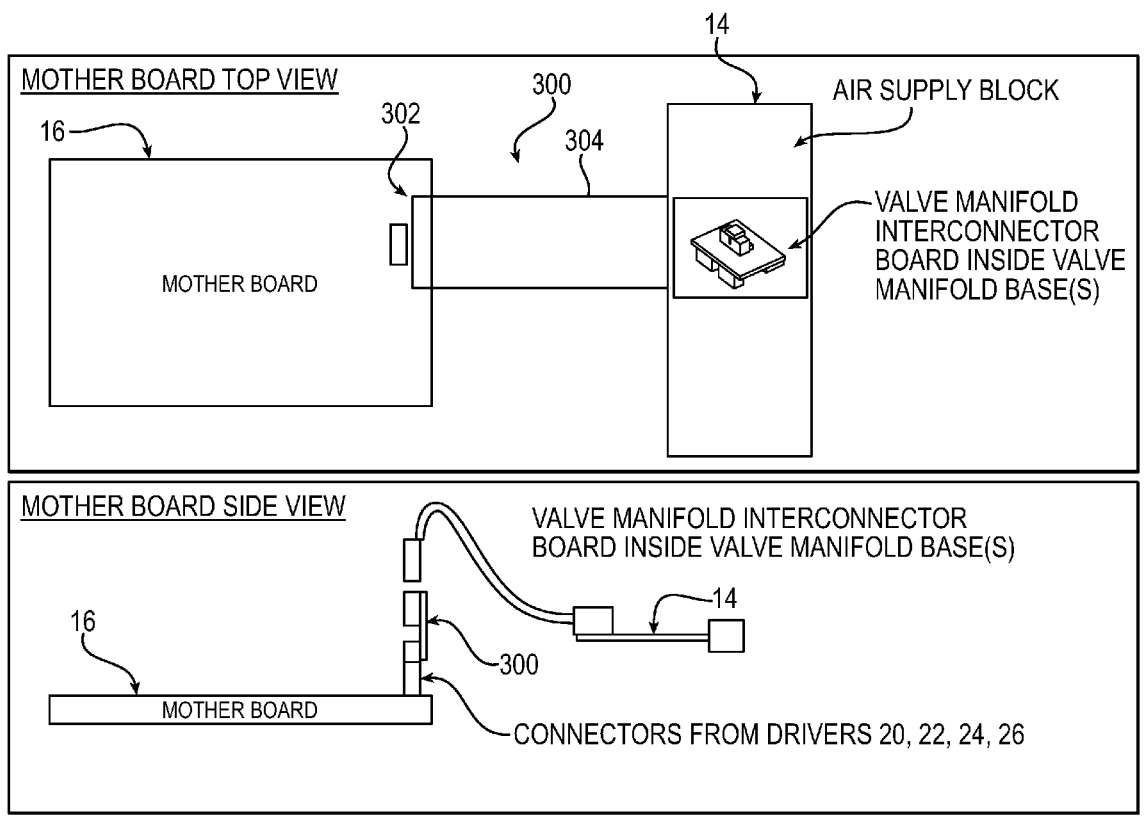
FIG. 17 is an electrical architecture block diagram of a top view and side view of a zoning adapter of a valve driver system in accordance with an embodiment of the invention.

Referring now to FIG. 17, there is shown a zoning adapter 300 for use in either the valve driver system 10 of FIGS. 1 and 2 or the valve driver system 110 of FIGS. 9 and 10. The zoning adapter 300 is shown at the right side of FIGS. 2 and 9. The zoning adapter 300 may be located on the non-safe variant of the ISO fieldbus controller 12 in FIG. 21, attached to the motherboard 16 in FIGS. 1 and 2. The zoning adapter 300 may take any suitable form for example a card, board, ribbon cable and/or wiring harness. As shown in FIGS. 17 and 21, the zoning adapter 300 may be inserted between and connected to the motherboard 16 of the fieldbus controller 12, more specifically the valve drivers 20, 22, 24, 26 thereof, and the interconnection board inside the base of the valve manifold 14. In the FIG. 17 embodiment, the zoning adapter 300 is connected to 30 and 10 pin connectors 302 on the motherboard 16, with ribbon cables 304 of the zoning adapter 300 going to the valve manifold 14.

The zoning adapter 300 shifts the addresses of the valves to enable more flexible control of a valve manifold, such as the valve manifold 14. In this regard, the zoning adapter 300 converts the logical addresses of, for example, the PLC, into the physical addresses of the valve manifold 14. The zoning adapter cable/board can port traces from one or more of the valve drivers 20, 22, 24, 26 to traces of the interconnection board for the valves of the valve manifold 14. In contrast to prior valve manifold controllers where each valve driver is only capable of driving its own eight (8) addresses, the zoning adapter 300 assigns a user specified valve address to an address of a valve driver, for example an address of one of valve drivers 20, 22, 24, 26. Thus, when the zoning adapter 300 receives the address from the valve driver, the zoning adapter 300 switches the received valve driver address to the specified valve address; and when the zoning adapter 300 receives the specified valve address, the zoning adapter 300 switches the received specified valve address to the corresponding valve driver address.

FIG. 18 shows a table of sample address conversions of six (6) different zoning adapters 322, 324, 326, 328, 330, 332, each having a different variant for zoning options. In FIG. 18, the valve manifold has eight (8) total valves wherein each valve has an extend and retract solenoid for example. In FIG. 18, there are 32 total logical addresses (0, 1, 2, 3, . . . , 31) wherein each valve driver 20, 22, 24, 26 has eight (8) logical addresses; and there are 16 total physical addresses (0, 1, 2, 3, . . . , 15) wherein the physical addresses. As such, the number of logical addresses is greater than the number of physical addresses. The valves are divided into different zones, which can be specified by the user depending on which valve driver is desired for which valves. As shown in FIG. 18, for example, the first zoning option 322 has four (4) zones of two (2) valves each; the second zoning option 324 has two (2) zones of four (4) valves each; the third zoning option 326 has four (4) zones with four (4) valves in one zone, two (2) valves in a second zone, one (1) valve in a third zone, and one (1) valve in a fourth zone; etc. Those skilled in the art will appreciate that the illustrative zoning options are exemplary only. Numerous other zoning options are contemplated. The zoning adapter 300 can be customized with a zoning option to fit the needs of any industrial networking requirement.

Figure 19:
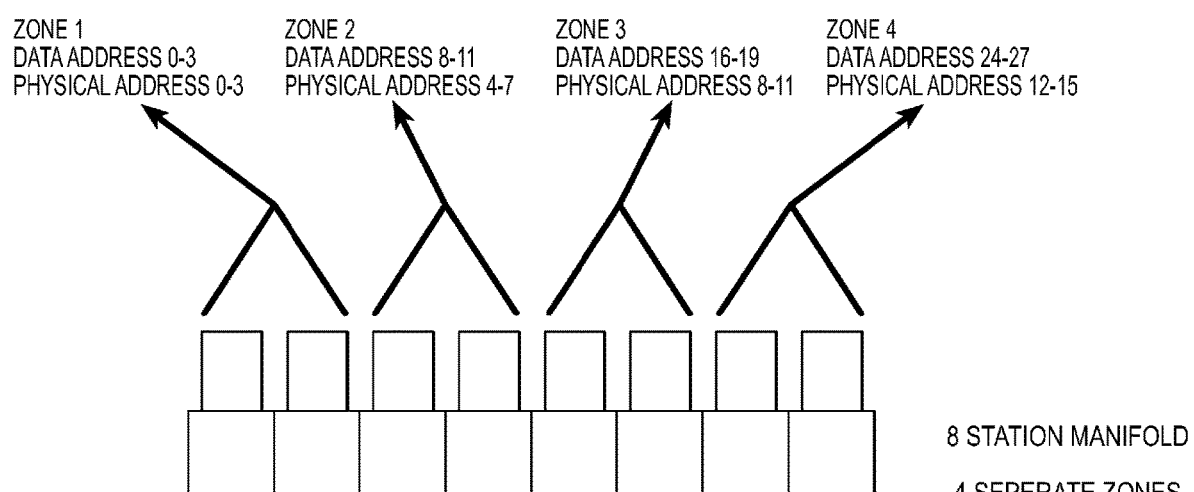
FIG. 19 is a table showing examples of zoning adapters and associated address conversions.

FIG. 19 shows an example of a zone controlled valve manifold 350 that has four double solenoid valves. The controller can be a controller having the four valve drivers 20, 22, 24, 26, such as a double address controller 60 of FIG. 6 that is capable of individually powering and addressing four different zones of four double solenoid valves. In other words, the 32 logical addresses are spread across the four different valve drivers 20, 22, 24, 26, each having eight (8) logical addresses. Thus, valve driver 20 has eight associated logical addresses 0-7; valve driver 22 has eight associated logical addresses 8-15; valve driver 24 has eight associated logical addresses 16-23; and valve driver 26 has eight associated logical addresses 24-31. The zoning adapter that converts the logical addresses of the controller to the physical addresses of the double solenoid valves can have a zoning option such as that of zoning adapter 322 in FIG. 18. Thus, the zoning adapter 322 converts the logical addresses 0, 1, 2, 3 of the valve driver 20 into the zone 1 physical addresses 0, 1, 2, 3 of the two (2) valves of the valve manifold 350 with a spacing in the 4, 5, 6, 7 portion of the logical addresses; converts the logical addresses 8, 9, 10, 11 of the valve driver 22 into the zone 2 physical addresses 4, 5, 6, 7 of the two (2) valves of the valve manifold 350 with a spacing in the 12, 13, 14, 15 portion of the logical addresses; converts the logical addresses 16, 17, 18, 19 of the valve driver 24 into the zone 3 physical addresses 8, 9, 10, 11 of the two (2) valves of the valve manifold 350 with a spacing in the 20, 21, 22, 23 portion of the logical addresses; converts the logical addresses 24, 25, 26, 27 of the valve driver 26 into the zone 4 physical addresses 12, 13, 14, 15 of the two (2) valves of the valve manifold 350 with a spacing in the 28, 29, 30, 31 portion of the logical addresses.

As will be appreciated, the diagram of FIG. 19 shows the potential small size of the valve manifold with the presence of the ability to make for example the data addresses 24-27 represent the physical addresses 12-15. Without the zoning adapter card/wire harness 322, the valve manifold 350 would have to be twice as long to provide the same amount of control. The zoning adapter ability to switch addresses allows the valve drivers to remain the same and enables a reduction in the necessary amount of valves attached in the manifold, conserving space. This could also prove useful if the user wants to control a small valve manifold with separate valve drivers but the valve manifold has already been created and is difficult to change.

Figure 20:
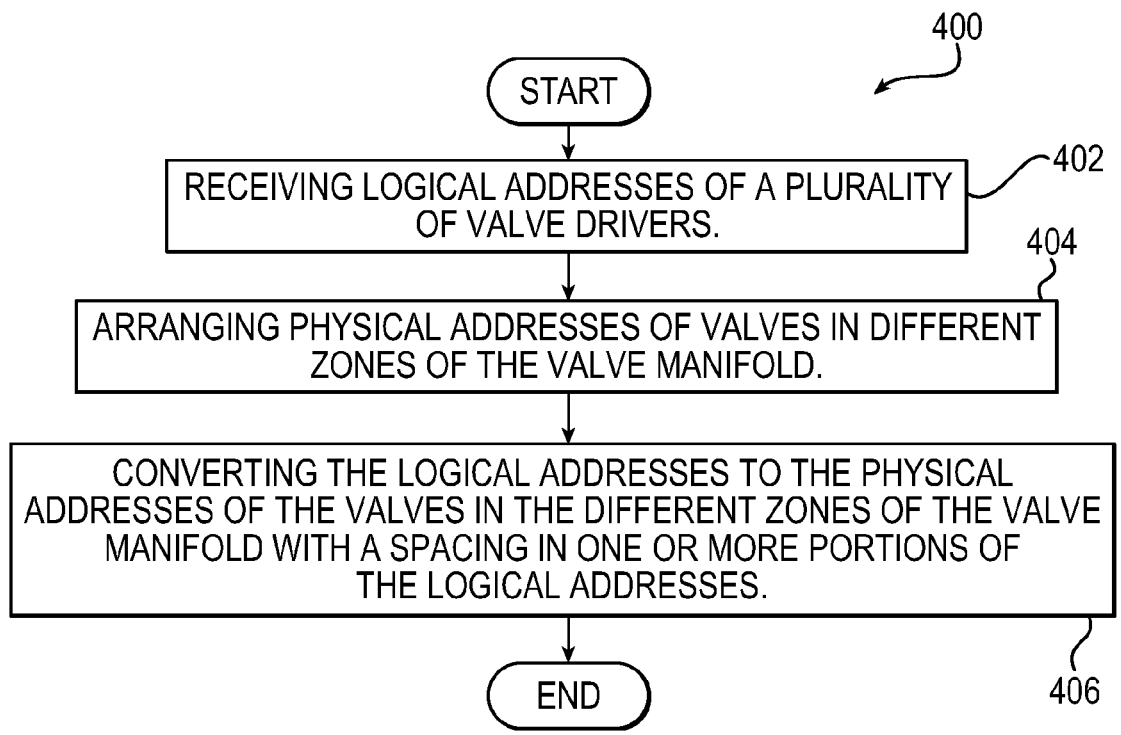
FIG. 20 is a flowchart showing method of adapting logical addresses of valve drivers to physical addresses of valves of a valve manifold.

FIG. 20 shows a flowchart 400 of a method of adapting logical addresses of valve drivers to physical addresses of valves of a valve manifold. The method includes a step 402 of receiving logical addresses of a plurality of valve drivers. In step 404, physical addresses of valves are arranged in different zones of the valve manifold. As noted above, the number of physical addresses may be less than the number of logical addresses. In step 406, the logical addresses are converted to the physical addresses of the valves in the different zones of the valve manifold with a spacing in one or more portions of the logical addresses. The converting may include converting 32 logical addresses (0, 1, 2, . . . 31) to 16 physical addresses of eight (8) valves, as noted with respect to FIG. 19.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A zoning adapter for adapting logical addresses of valve drivers to physical addresses of valves of a valve manifold, the zoning adapter comprising:
   a first end configured to receive logical addresses of a plurality of valve drivers;
   a second end for connection to physical addresses of valves in different zones of the valve manifold, wherein the number of physical addresses is less than the number of logical addresses; and
   a conversion portion that converts the logical addresses to the physical addresses of the valves in the different zones of the valve manifold with a spacing in one or more portions of the logical addresses;
   wherein the zoning adapter includes a card, board, ribbon cable and/or wiring harness configured to port traces from the plurality of valve drivers to traces of an interconnection board for the plurality of valves of the valve manifold.

2. The zoning adapter of claim 1, wherein the valve drivers are separately powered.

3. The zoning adapter of claim 1, wherein the conversion portion converts 32 logical addresses (0, 1, 2, . . . 31) to 16 physical addresses of eight (8) valves.

4. The zoning adapter of claim 3, wherein the 32 logical addresses are the logical addresses of four (4) different valve drivers each having eight (8) logical addresses.

5. The zoning adapter of claim 3, wherein the eight (8) valves are in four (4) different zones of the valve manifold, and wherein the conversion portion converts the 32 logical addresses with a spacing in four (4) portions (4, 5, 6, 7; 12, 13, 14, 15; 20, 21, 22, 23; 28, 29, 30, 31) of the logical addresses (0, 1, 2, . . . 31).

6. A method of adapting logical addresses of valve drivers to physical addresses of valves of a valve manifold, comprising:
- providing a zoning adapter including a card, board, ribbon cable and/or wiring harness configured to port traces from a plurality of valve drivers to traces of an interconnection board for a plurality of valves of the valve manifold;
- receiving, by the zoning adapter, logical addresses of the plurality of valve drivers;
- arranging, by the zoning adapter, physical addresses of valves in different zones of the valve manifold, wherein the number of physical addresses is less than the number of logical addresses; and
- converting, by the zoning adapter, the logical addresses to the physical addresses of the valves in the different zones of the valve manifold with a spacing in one or more portions of the logical addresses.

7. The method of claim 6, wherein the converting includes converting 32 logical addresses (0, 1, 2, . . . 31) to 16 physical addresses of eight (8) valves.

* * * * *